United States Patent [19]

Yasumoto et al.

[11] 4,410,985
[45] Oct. 18, 1983

[54] DATA TRANSMISSION SYSTEM AND METHOD

[75] Inventors: Seiichi Yasumoto; Hitoshi Fushimi; Jushi Ide; Masakazu Okada, all of Ibaraki, Japan

[73] Assignee: Hitachi, Ltd., Tokyo, Japan

[21] Appl. No.: 247,267

[22] Filed: Mar. 25, 1981

[51] Int. Cl.³ .................... H04Q 9/00; G06F 11/00
[52] U.S. Cl. ................. 371/22; 340/825.05; 340/825.08; 370/86; 371/62
[58] Field of Search ............ 371/22, 62; 370/86, 370/90; 340/825.05, 825.08; 364/200, 900

[56] References Cited

U.S. PATENT DOCUMENTS

| | | | |
|---|---|---|---|
| 3,639,694 | 2/1972 | Deutsch et al. | 364/200 |
| 3,652,993 | 3/1972 | Bridwell et al. | 340/825.08 |
| 3,723,971 | 3/1973 | Betts et al. | 370/86 |
| 3,728,681 | 4/1973 | Fuller et al. | 370/86 |
| 4,078,228 | 3/1978 | Miyazaki | 370/86 |

OTHER PUBLICATIONS

V. A. Albaugh et al., Fault Detection on Serial Communication Bus, IBM Technical Disclosure Bulletin, vol. 22, No. 5, Oct. 1979, pp. 1778-1779.

Primary Examiner—Charles E. Atkinson
Attorney, Agent, or Firm—Antonelli, Terry & Wands

[57] ABSTRACT

A central station and a plurality of transmission stations are connected in cascade by a serial transmission line, and constitute a looped data highway system. The central station controls the whole system. The system allows the transmission station having a data signal transmission request to send out a data signal by means of a normal polling signal, but only the station having sent out the data signal by means of the preceding normal polling signal is allowed to send out the data signal again in response to a retry polling signal.

14 Claims, 17 Drawing Figures

FIG. 3A  NORMAL POLLING SIGNAL

| 0 | 1 | 1 | 1 | 1 | 1 | 1 | 1 | 1 | 1 | 1 | 1 | 1 | 0 | 0 | 1 | 1 | 1 | 1 | 1 | 1 | 0 | 0 |
|---|---|---|---|---|---|---|---|---|---|---|---|---|---|---|---|---|---|---|---|---|---|---|

GA                                              NP

FIG. 3B  RETRY POLLING SIGNAL

| 0 | 1 | 1 | 1 | 1 | 1 | 1 | 1 | 1 | 1 | 1 | 1 | 1 | 0 | 0 | 0 | 0 | 0 | 0 | 1 | 1 | 0 | 0 |
|---|---|---|---|---|---|---|---|---|---|---|---|---|---|---|---|---|---|---|---|---|---|---|

GA                                              RP

FIG. 3C  RESERVE SIGNAL

| 0 | 1 | 1 | 1 | 1 | 1 | 1 | 1 | 1 | 1 | 1 | 1 | 1 | 0 | 0 | 1 | 1 | 0 | 0 | 0 | 0 | 0 | 0 |
|---|---|---|---|---|---|---|---|---|---|---|---|---|---|---|---|---|---|---|---|---|---|---|

GA                                              RS

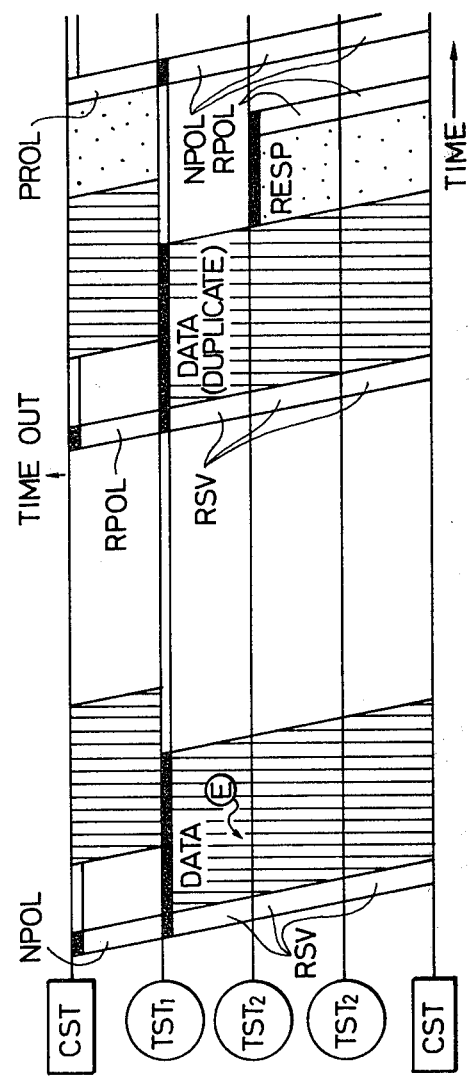

DATA TRANSMISSION SYSTEM AND METHOD

BACKGROUND OF THE INVENTION

1. Field of the Invention

This invention relates to a data transmission system and method, and more particularly to a looped data transmission system and a method using a polling signal.

2. Description of the Prior Art

It is often required to exchange data among a large number of stations. In such case, a looped data highway system is frequently adopted. In the looped data highway system, the transmission stations are successively connected in cascade by a serial data transmission line. Accordingly, data needs to be correctly transmitted and received in a short time between the transmission station sending out the data and the transmission station receiving the data. Further, when two or more transmission stations request to send out data at the same time, they need to be collectively controlled so as to prevent collision of data on the transmission line.

Therefore, a polling system has heretofore been adopted. By way of example, one of the stations of the looped data highway system is determined as a central station for purposes of control. The central station sends out to one adjacent transmission station a polling signal which allows it to send out data. When this transmission station has no data to be sent out, it sends out the polling signal to the adjacent transmission station. When any of the transmission stations receiving the polling signal successively sent out in this manner is the station requesting the transmission of data, this station inhibits the polling signal from being sent out to the next station and sends out a data signal which consists of the transmission data, address data indicative of the station itself and address data indicative of the transmission station to receive the transmission data. The adjacent transmission station receives the data signal sent out, and when it is not the station to receive this data signal, it transfers it to the adjacent transmission station. The transmission station appointed by the reception address of the data signal thus transferred receives and loads the data signal. The station having received and loaded the data signal sends out a response signal which consists of its own address, the address of the station having sent out the received data signal, and data to the effect that the data signal has been received. The response signal is successively transferred among the transmission stations similar to the data signal, and is received and loaded into the transmission station which has sent out the data signal. When the data to be transmitted and received have been correctly transmitted and received in this way, the transmission station which has sent out the data signal and which has confirmed the correct reception thereof by the reception of the response signal sends out the polling signal to trigger the next transmission and reception of data. When the response signal is not received, this polling signal is not sent out. At this time, the central station monitors a time interval from the sending-out of the first polling signal to the sending-out of the next polling signal, and if the time interval exceeds a predetermined value, the central station sends out the polling signal so as to prevent the system from stagnating due to the bad condition of the first transmission and reception. However, a problem arises in a case where the data sending-out request is made by a transmission station which lies upstream of, or closer to the central station than, the transmission station which has responded to the first polling signal of the central station. In this case, the station having responded to the first polling signal maintains the data signal sending-out state, and also the upper stream station having received the next polling signal falls into the data signal sending-out state.

When the two or more stations have been simultaneously placed in the data signal sending-out states in the looped data highway system, this system locked-up and becomes incapable of transmitting or receiving data.

SUMMARY OF THE INVENTION

It is accordingly an object of this invention to provide a data transmission system and method free from the locked-up condition.

Another object of this invention is to provide a data transmission system and method capable of enhancing the transmission efficiency.

According to this invention, the polling signal which the central station sends out is provided either as a normal polling signal which signifies the ordinary allowance of the sending-out of a data signal, or a retry polling signal which is sent out on the basis of the monitoring of an elapsed time since the sending-out of the polling signal and by which only a transmission station having already received the polling signal and sent out the data signal is allowed to send out the data again. Thus, two or more transmission stations are prevented from being placed in the data signal sending-out states at the same time.

Further, according to this invention, supposing that the transmission station to send out a response signal sends out a retry polling station subsequently to the response signal, when the transmission station having sent out the data signal has correctly received the response signal and has detected the normal reception of the data signal, it converts the retry polling signal subsequently received into a normal polling signal and sends out the latter, whereby the next transmission and reception of the data signal can be triggered quickly, and when it has not detected the correct reception of the response signal, it can send out the data signal again immediately upon receiving the retry polling signal, so that the transmission efficiency can be enhanced.

BRIEF DESCRIPTION OF THE DRAWINGS

FIGS. 3(A), 3(B) and 3(C) are diagrams showing structural examples of signal codes for the transmission and reception control which can be adopted in this invention;

FIGS. 7(A) and 7(B), and FIGS. 8(A) and 8(B) are diagrams showing in the same form as in FIGS. 6(A) and 6(B) time charts and operation flow charts illustrative of the states of the transmission and reception of the signals at the time when errors have developed in the data signal and a response signal, respectively.

DETAILED DESCRIPTION OF THE PREFERRED EMBODIMENT

Figure 1:
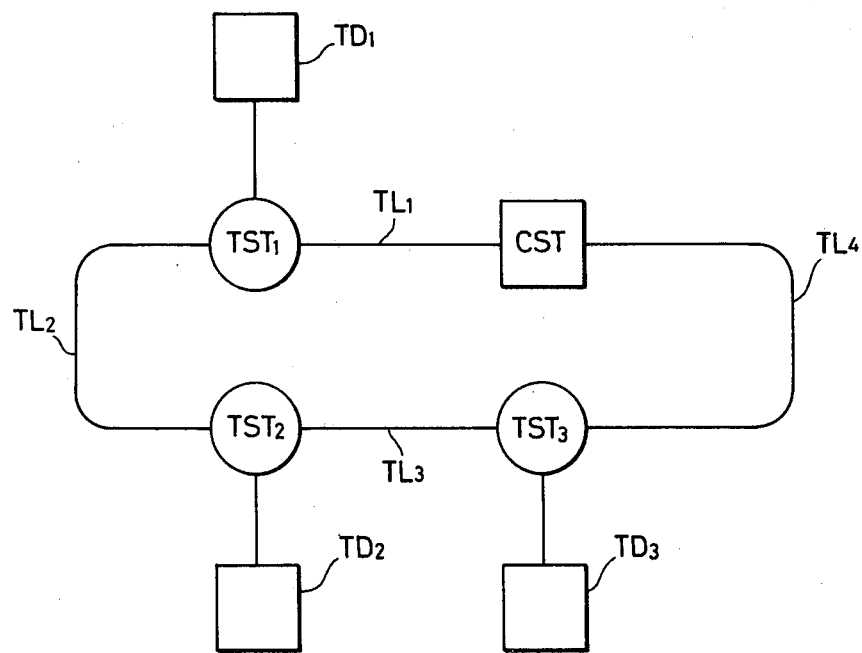
FIG. 1 is a block diagram showing an example of the construction of a looped data highway system to which this invention is applied.

FIG. 1 is a block diagram showing in outline a looped data highway system to which this invention is applied. A block CST indicates a central station, which is connected in the loop in order to collectively control the transmission and reception of data signals. Blocks $TST_1-TST_3$ indicate transmission stations, to which terminal devices $TD_1-TD_3$ are respectively connected. Each of the terminal devices is a computer, an input/output device of a computer, or any other electric machine. $TL_1-TL_4$ denote transmission lines, which connect the adjacent stations, respectively.

According to this invention, a normal polling signal NPOL to indicate that the respective transmission stations $TST_1-TST_3$ are allowed to transmit the data signals is first generated by the central station CST, whereby the transmission and reception of the data signals are triggered. The normal polling signal NPOL generated by the central station CST is transmitted to the station $TST_1$ through the line $TL_1$. When the station $TST_1$ needs to transmit the data signal, it transmits upon receiving the normal polling signal NPOL a reserve signal RSV to the effect that the particular station transmits data, and it subsequently transmits the data signal. When the station $TST_1$ has no need to transmit a data signal, it transmits the normal polling signal NPOL to the station $TST_2$ through the line $TL_2$. In the case where the station $TST_1$ has transmitted the reserve signal RSV, the station $TST_2$ permits the signal RSV to pass therthrough whether or not the particular station needs to transmit a data signal. In case where the station $TST_2$ has received the normal polling signal NPOL, it transmits the signal RSV or the signal NPOL to the station $TST_3$ through the line $TL_3$ in dependence on the necessity for the data signal transmission similar to the station $TST_1$. The station $TST_3$ operates similarly to the station $TST_2$.

Upon receiving the reserve signal RSV through the line $TL_4$, the central station CST changes into the operating state of a passing mode and permits the data signal transmitted subsequently to the reserve signal RSV to pass therethrough.

The station TST having transmitted the reserve signal RSV transmits the data signal subsequently thereto. When the transmission and reception of this data signal as will be discussed in detail later have not progressed favorably, according to this invention, the central station or the tranmission station transmits a retry polling signal RPOL to allow the retransmission of the data signal, thereby to permit the prevention of lock-up and an efficient transmission and reception of the data signal. This will also be described later along with the details of the transmission and reception of the data signal.

Figure 2A:
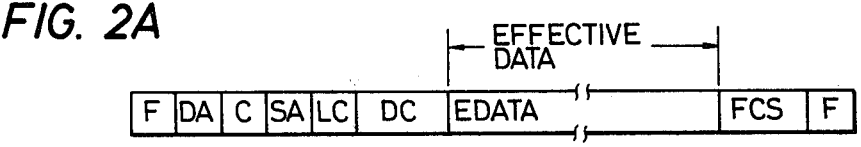
FIGS. 2(A) and 2(B) are diagrams showing examples of data frame and response frame structures which can be adopted in this invention, respectively.
Figure 2B:

FIGS. 2(A) and 2(B) show examples of the formats of the data signal from the transmitting station and a response signal which reports the proper reception of the data signal from the receiving station to the transmitting station, respectively. In the figures, letter F denotes a flag, which signifies the start or end of the signal frame. Letters DA denote address data which indicates the receiving station of the frame. Letter C denotes a control signal, which is used for indicating a command of the operation over the receiving station or a response to the command. Letters SA denote address data which indicates the transmitting station of the frame. Letters LC denote data which indicates the property of the information. Length data DC indicates the length (number of bytes) of effective data desired to be transmitted. The effective data denoted by EDATA is substantial data to be transmitted and received between the stations. Shown at FCS are additional data for data error check. Letters LA denote additional data which indicates the reception situation of the effective data EDATA in the receiving station (for example, that the effective data was normally received, or that it was not received because the computer was busy). Letters STS denote additional data of the data LA. Here, by way of example, the data DC, FCS and STS consist of 2 bytes, respectively, the data EDATA is at most 512 bytes, and the other data is 1 byte, respectively. Although the frame format can be set as desired, it is recommended to conform with, for example, "HIGH LEVEL DATA LINK CONTROL PROCEDURES—FRAME STRUCTURE" stipulated in the Japanese Industrial Standards (JIS) C6363-1978.

FIGS. 3(A), 3(B) and 3(C) show examples of the normal polling signal, the retry polling signal and the reserve signal for determining the transmitting station as explained in conjunction with FIG. 1, respectively. Each of these signals is constructed of a "go ahead" signal GA and an effective signal NP, RP or RS. The signals GA consist of 2 bytes, respectively, and have the same contents as illustrated in the figures. The signals NP, RP and RS consist of 1 byte, respectively, and have contents different from one another.

Figure 4A:
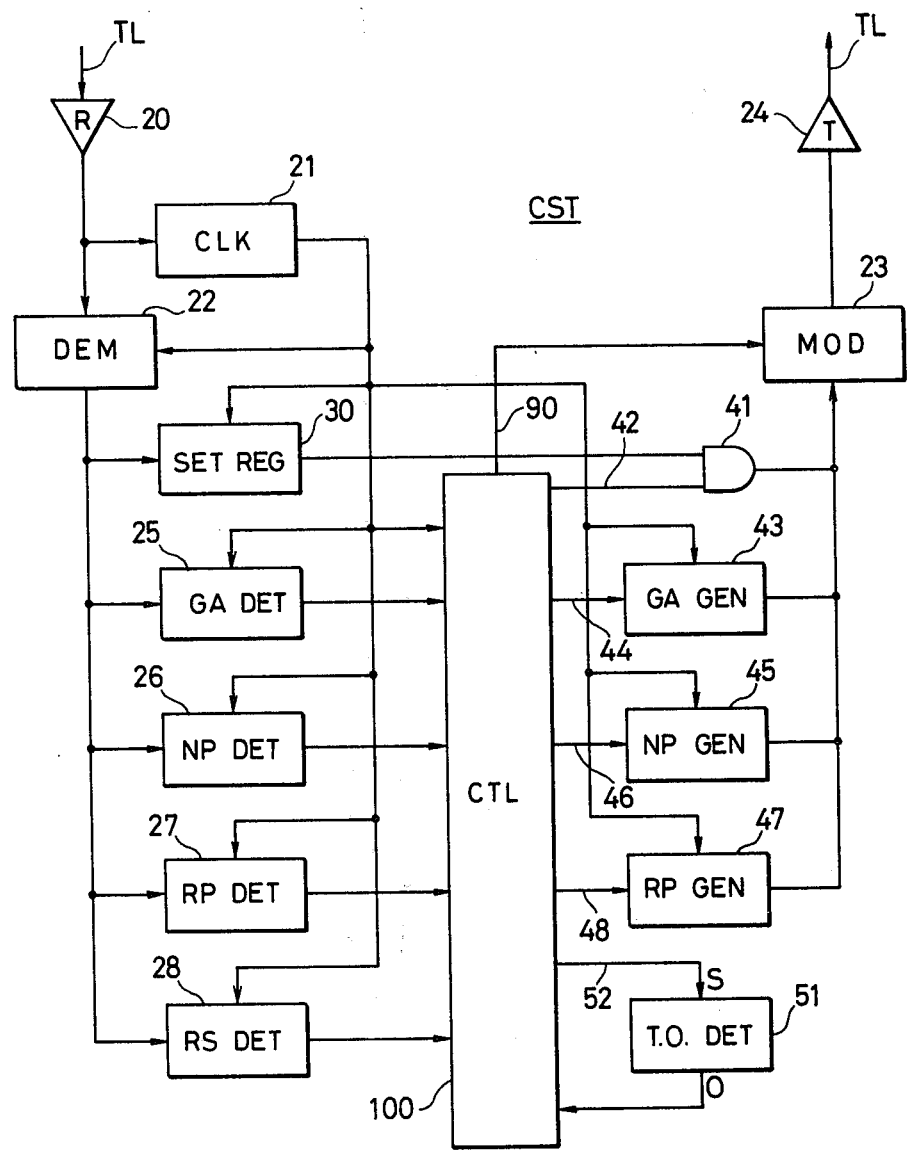
FIG. 4(A) and FIGS. 4(B) and 4(C) are diagrams showing examples of the construction of a central station appropriate for the performance of this invention and flow charts for elucidating the operation thereof, respectively.

FIG. 4(A) is a block diagram showing the construction of the central station CST. Numeral 20 designates a receiver, which receives the signal entering from the transmission line TL and amplifies it to a predetermined level. A clock circuit 21 reproduces a clock signal from a received waveform. A demodulator 22 reproduces the transmitted signal from the received waveform and the clock signal. A modulator 23 puts the signal to-be-transmitted into a waveform corresponding to a predetermined transmission system. A transmitter 24 amplifies the output of the modulator 23, and delivers the amplified signal to the transmission line TL. These circuits 21–24 may be of any type, and by way of example, those described in Japanese Patent Application No. 54-155645 may well be adopted. Numerals 25, 26, 27 and 28 indicate signal detectors, respectively. They are respectively driven by the output clock of the clock circuit 21 to provide outputs when the signals delivered from the demodulator 22 are predetermined patterns. That is, the detector 25 detects and delivers the "go ahead" signal GA, the detector 26 the effective signal NP, the detector 27 the effective signal RP, and the detector 28 the effective signal RS. Numeral 100 designates a control circuit, which receives the outputs of the clock circuit 21 and the signal detectors 25–28 and provides predetermined control signals to be described later. While the control circuit 100 can be constructed of any desired device, the use of the so-called microprocessor (microcomputer) is recommended. Shown at numeral 30 is a shift register to which the transmitted signals and the clock signal are applied. Since the shift register 30 has a shifting capability of 1 byte (8 bits), each signal is delayed 1 byte. Numeral 41 designates an AND gate, which allows the output of the shift register 30 to pass therethrough when the control circuit 100 has delivered a signal to a lead 42. Numerals 43, 45 and 47 indicate signal generators, which have the output of the clock circuit 21 applied thereto respectively and which generate the signals GA, NP and RP when the signals from the control circuit 100 have been delivered to leads 44, 46 and 48 respectively. The outputs of these circuits 41, 43, 45 and 47 are applied to the modulator 23. A time out detector 51 includes therein a timer (not shown) which is set when the output of the control circuit 100 has been delivered to a lead 52. Upon lapse of at least a predetermined time after the timer has been set, a time out output is provided and is applied to the control circuit 100. When the timer has the set signal applied thereto before the lapse of the predetermined time, it is reset to measure a time from the point of time of the application again. The modulator 23 transmits a time fill signal (continuous "0" signal) when the control circuit 100 has delivered the signal to a lead 90.

Figure 4B:
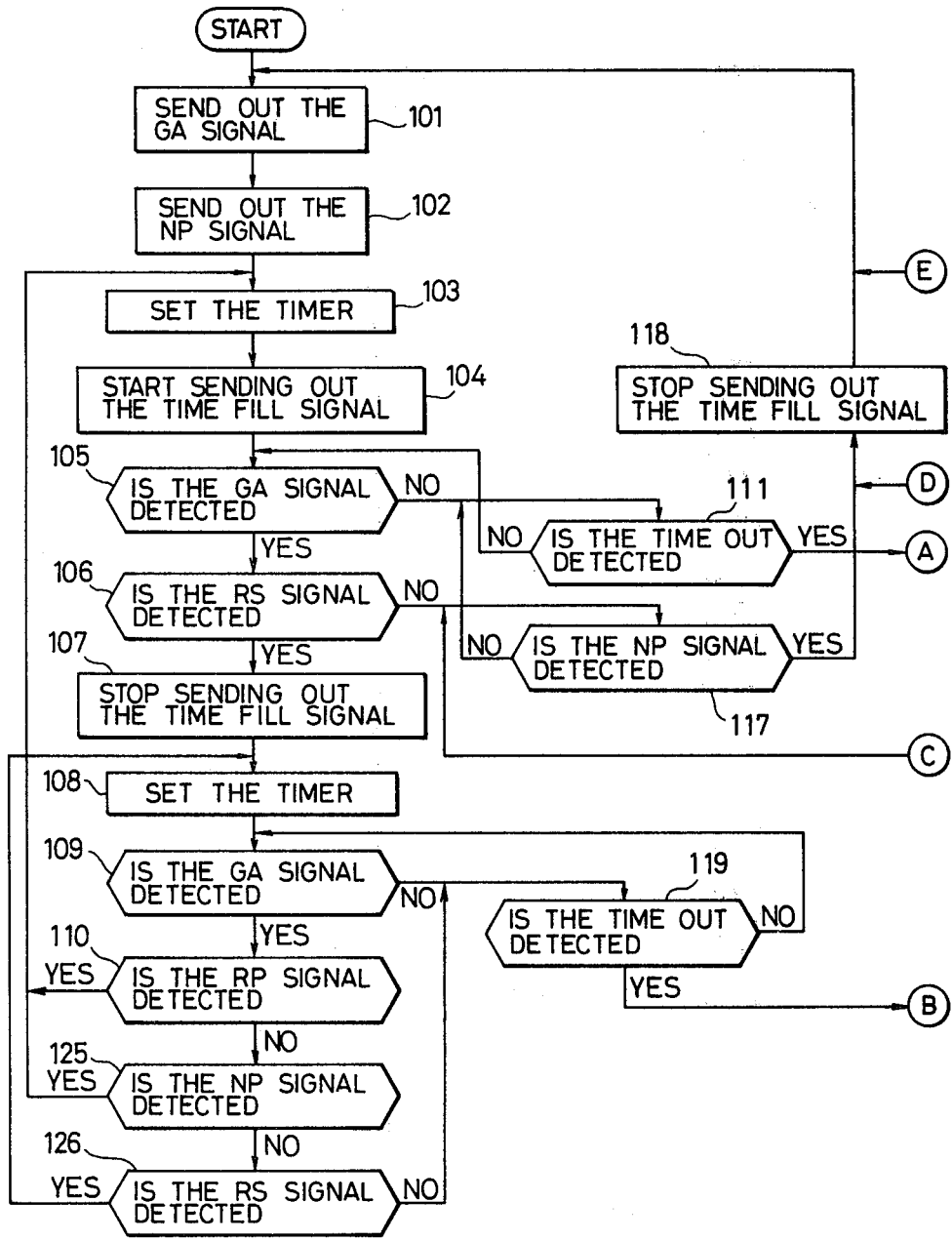
Figure 4C:
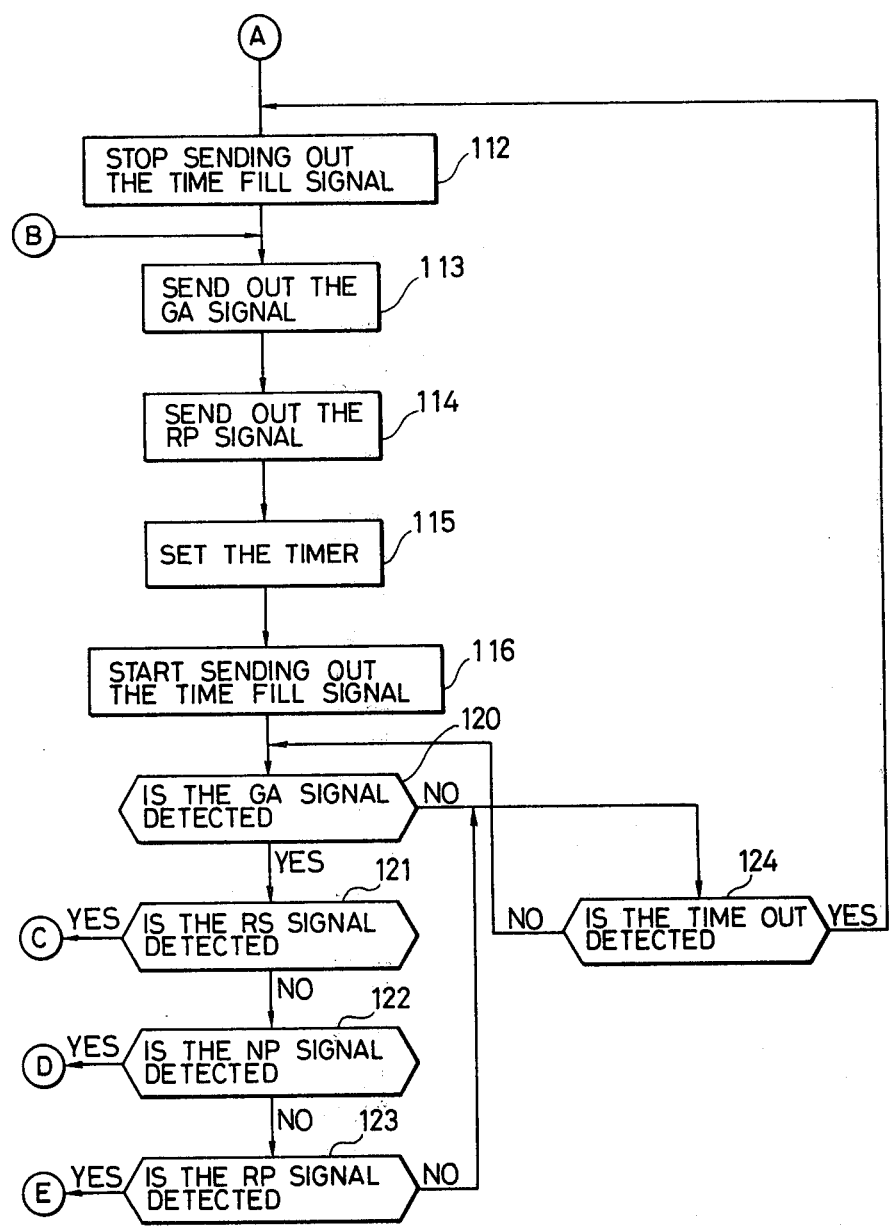

FIGS. 4(B) and 4(C) are flow charts for explaining the operation of the control circuit 100. The details of the operation will be described later.

Figure 5A:
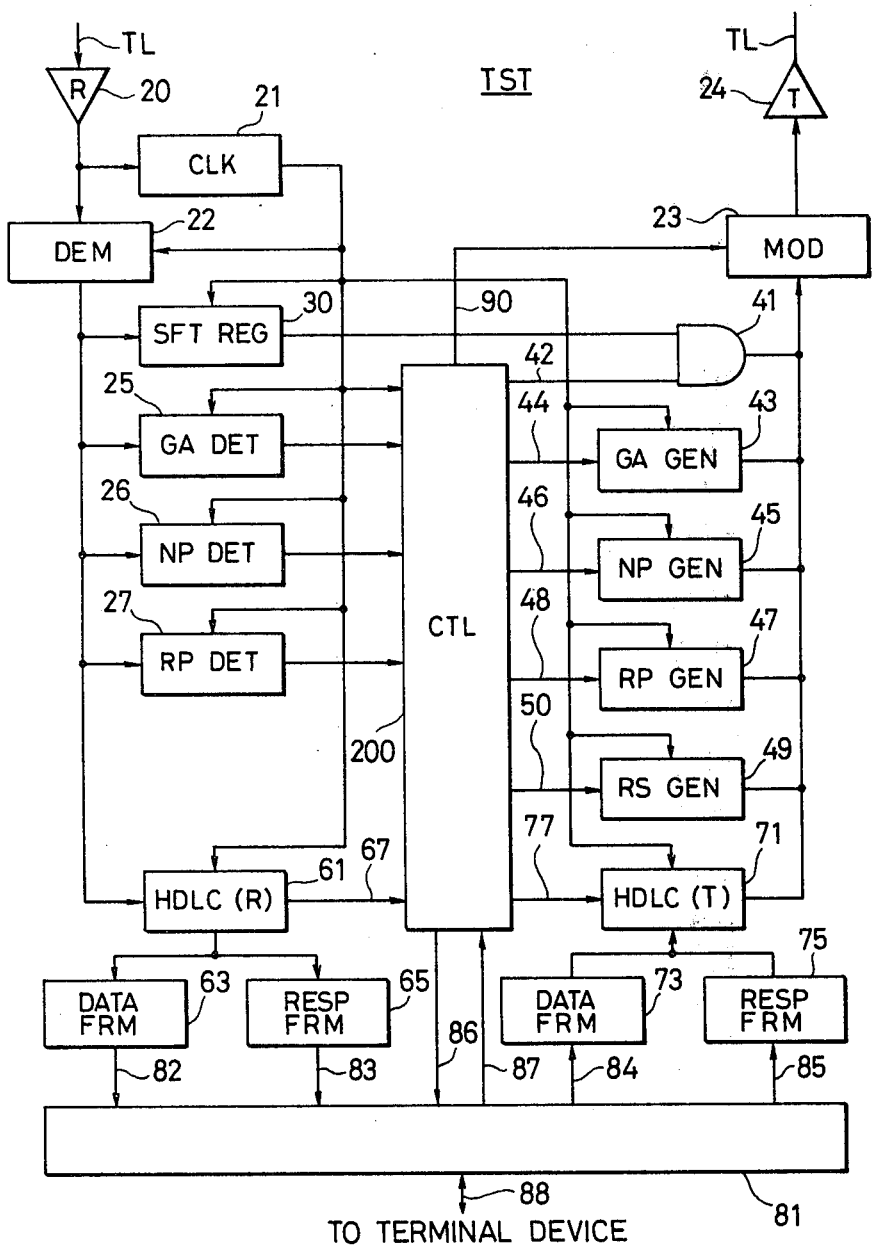
FIGS. 5(A) and 5(B) are diagrams showing examples of the construction of a transmission station appropriate for the performance of this invention and a flow chart for elucidating the operation thereof, respectively.

FIG. 5(A) is a block diagram showing the construction of the transmission station TST. In FIG. 5(A), parts indicated by the same symbols as in FIG. 4(A) are the same components. As seen by comparing both figures, the signal detectors 25–27, the signal generators 43–47 and the circuits concerning the signal transmission and reception 20–24, 30 and 41 are the same as in the central station CST. Numeral 49 designates a signal generator, which generates the signal RS when a signal is delivered from a control circuit 200 to a lead 50. Shown at numeral 61 is a frame receiving circuit. The receiver circuit 61 receives the signal when the station to receive the signal as indicated by the address data DA is the corresponding station. In the case where the received signal is the data signal, it is stored in a data signal memory 63, while in the case where it is the response signal, it is stored in a response signal memory 65. Matters necessary for the control of the transmission and reception, for example, that the signal received by the receiver circuit 61 is the address of the station itself and that it is the data signal or the response signal, are sent to the control circuit 200 through a lead 67. Shown at numeral 71 is a signal frame transmitting circuit. In the case where the signal to be transmitted constitutes the data frame, data stored in a data signal memory 73 is transmitted, while in the case where it constitutes the response frame, data stored in a response signal memory 75 is transmitted. Which is to be transmitted is indicated through a lead 77 by the control circuit 200. Numeral 81 denotes an interface circuit for coupling the transmission station TST and the terminal device TD. The interface circuit 81 is connected with the memories by data buses 82, 83, 84 and 85, with the control circuit 200 by leads 86 and 87, and with the terminal device TD by a lead 88 so as to exchange necessary information and data. The signal generator 49 and the transmitter circuit 71 are of course connected to the modulator 23. The details of the operation of the control circuit 200 will be described later.

Figure 6A:
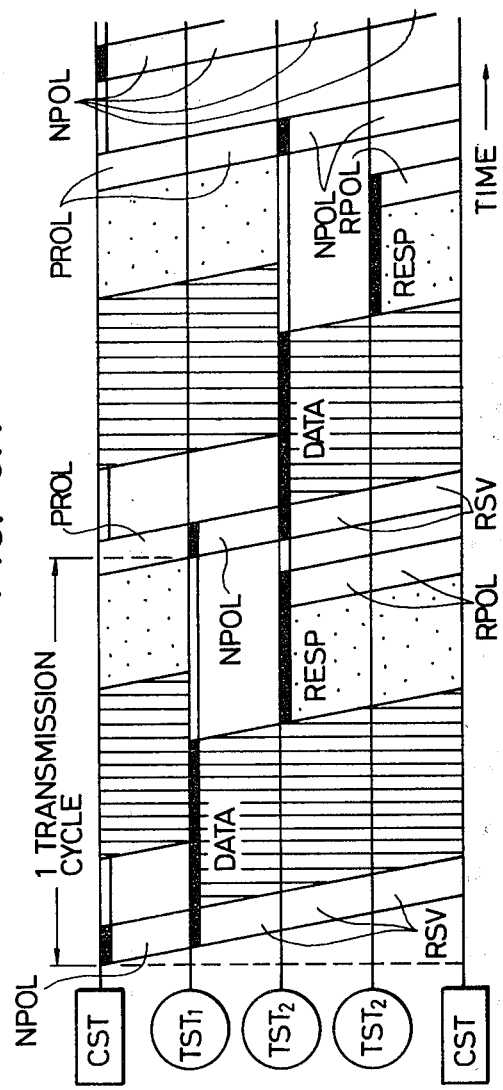
FIGS. 6(A) and 6(B) are a time chart and an operation flow chart showing the states of the transmission and reception of signals among the central station and the transmission stations at the time when a data signal has been normally transmitted and received in accordance with an embodiment of this invention, respectively.
Figure 6B:
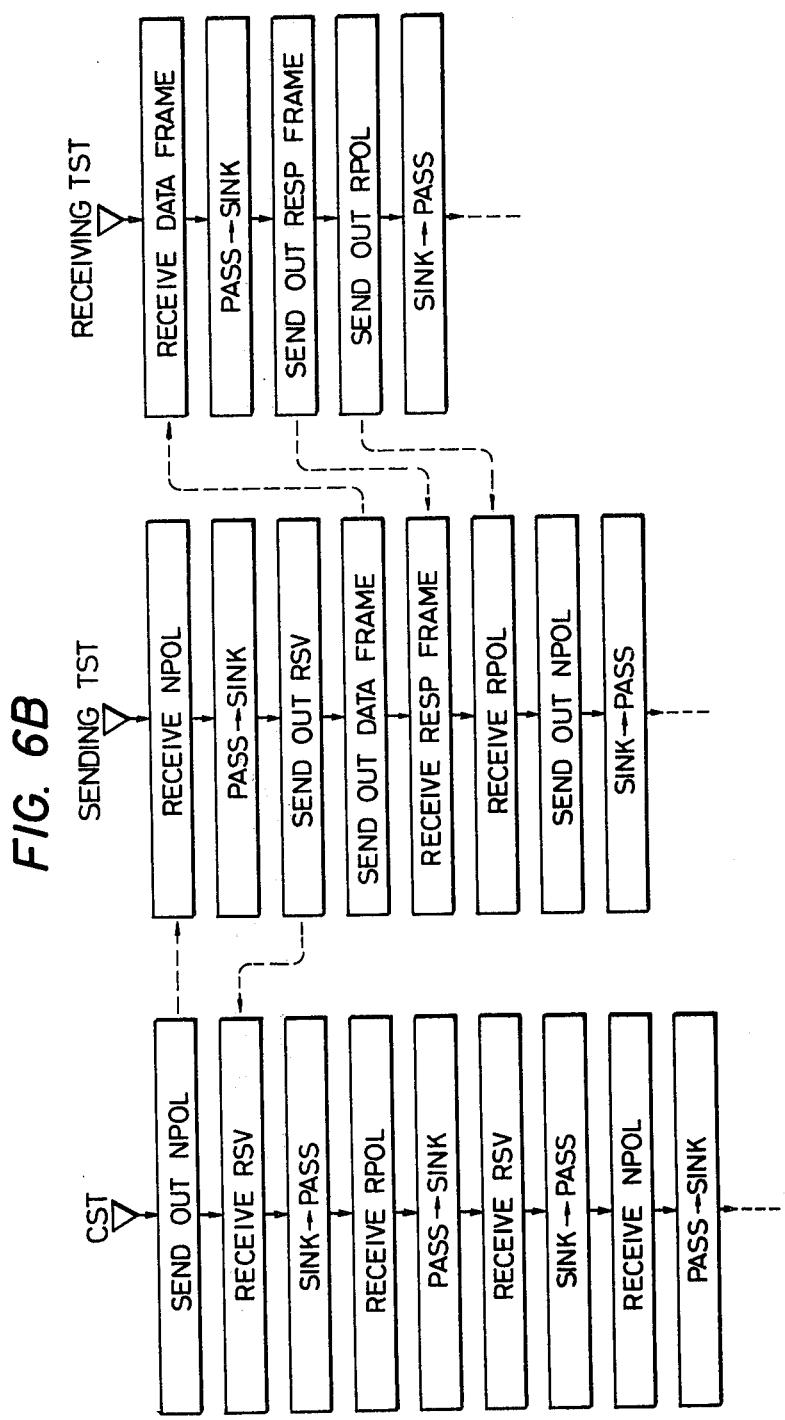
Figure 7B:
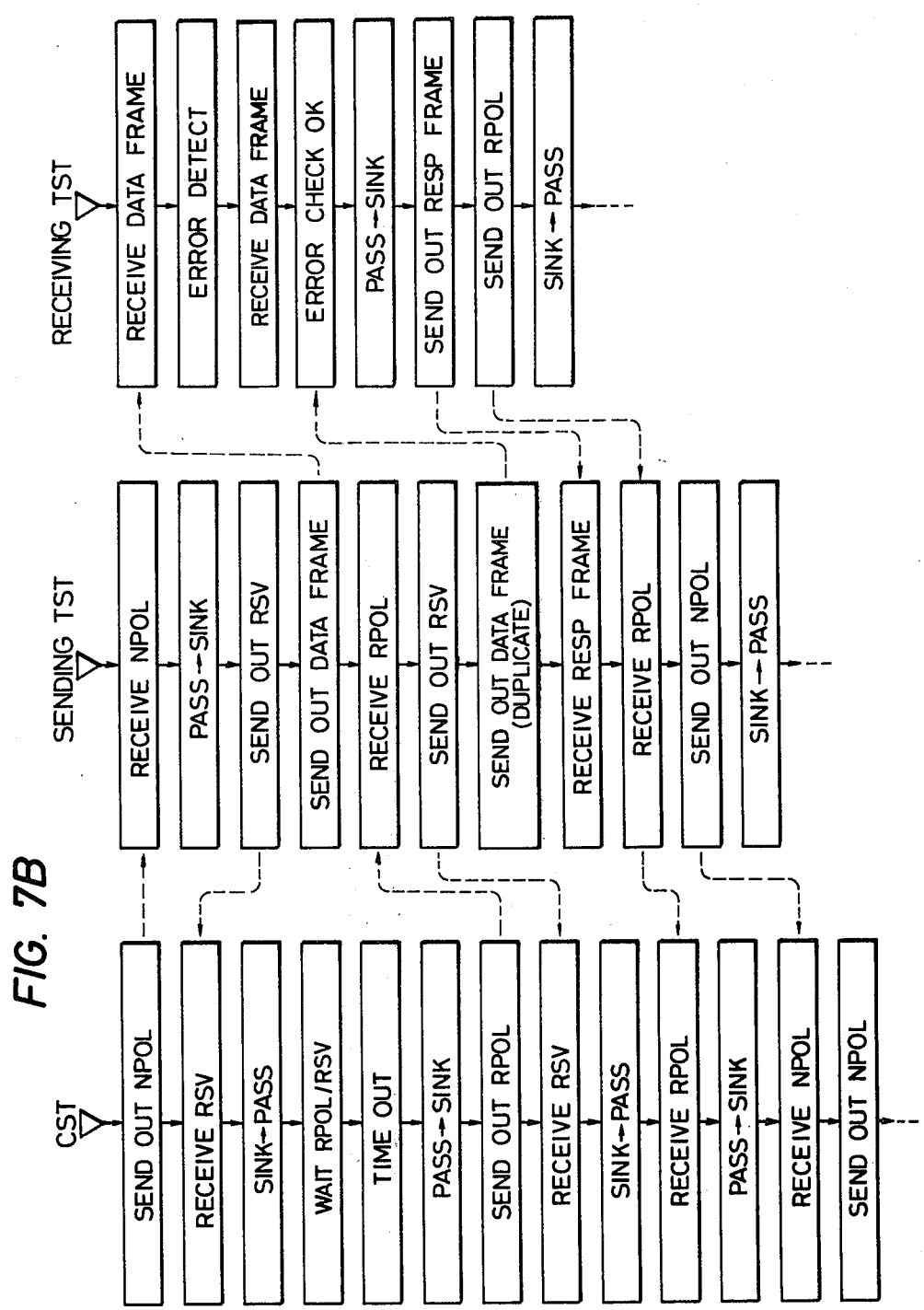
Figure 8A:
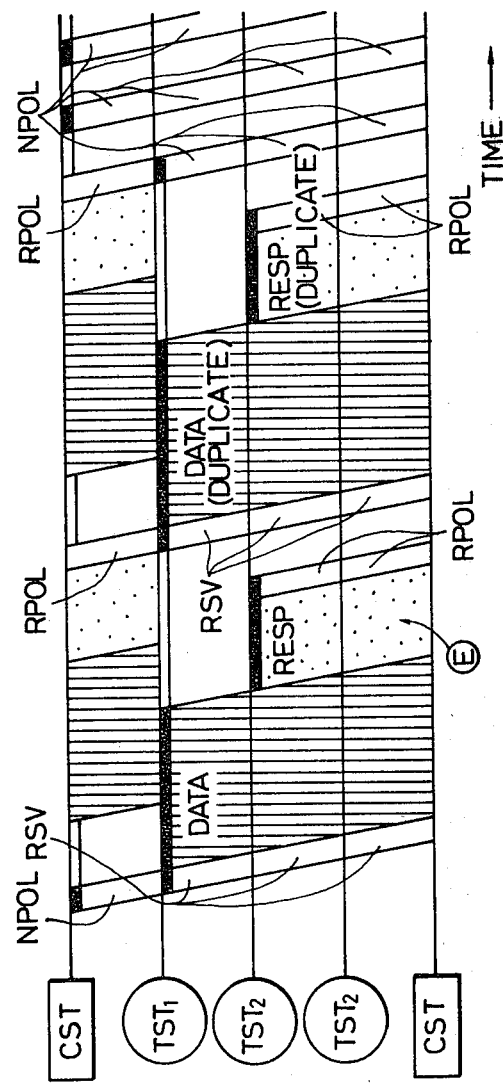
Figure 8B:
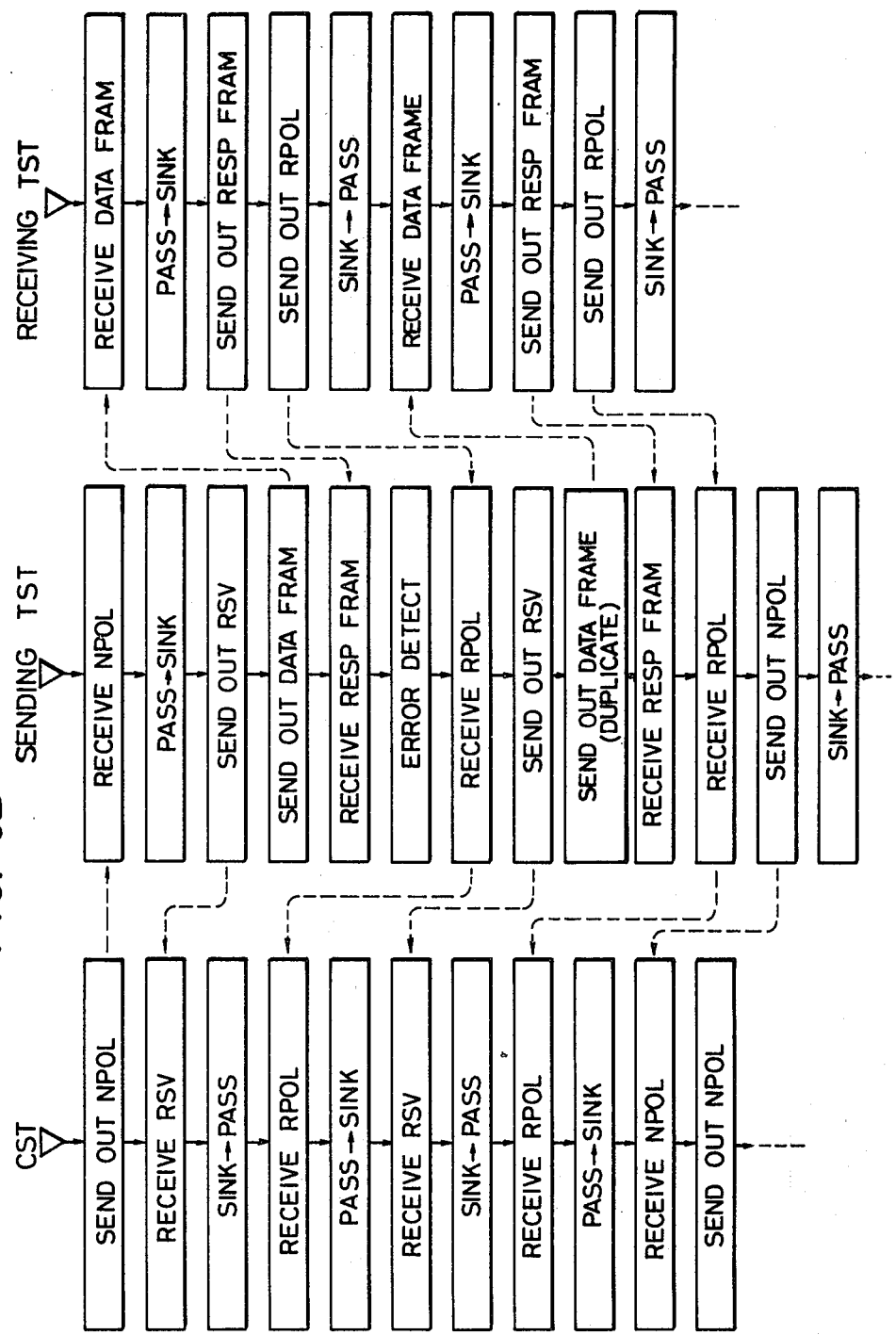

FIGS. 6(A), 7(A) and 8(A) are time charts in the cases where the transmission and reception of the data were normally performed, where the data signal frame was not normally received, and where the response signal frame was not normally received, respectively. FIGS. 6(B), 7(B) and 8(B) are flow charts showing how the operations of the central stations CST, the transmitting transmission stations and the receiving transmission stations correspond to the cases of FIGS. 6(A), 7(A) and 8(A), respectively.

Figure 5B:
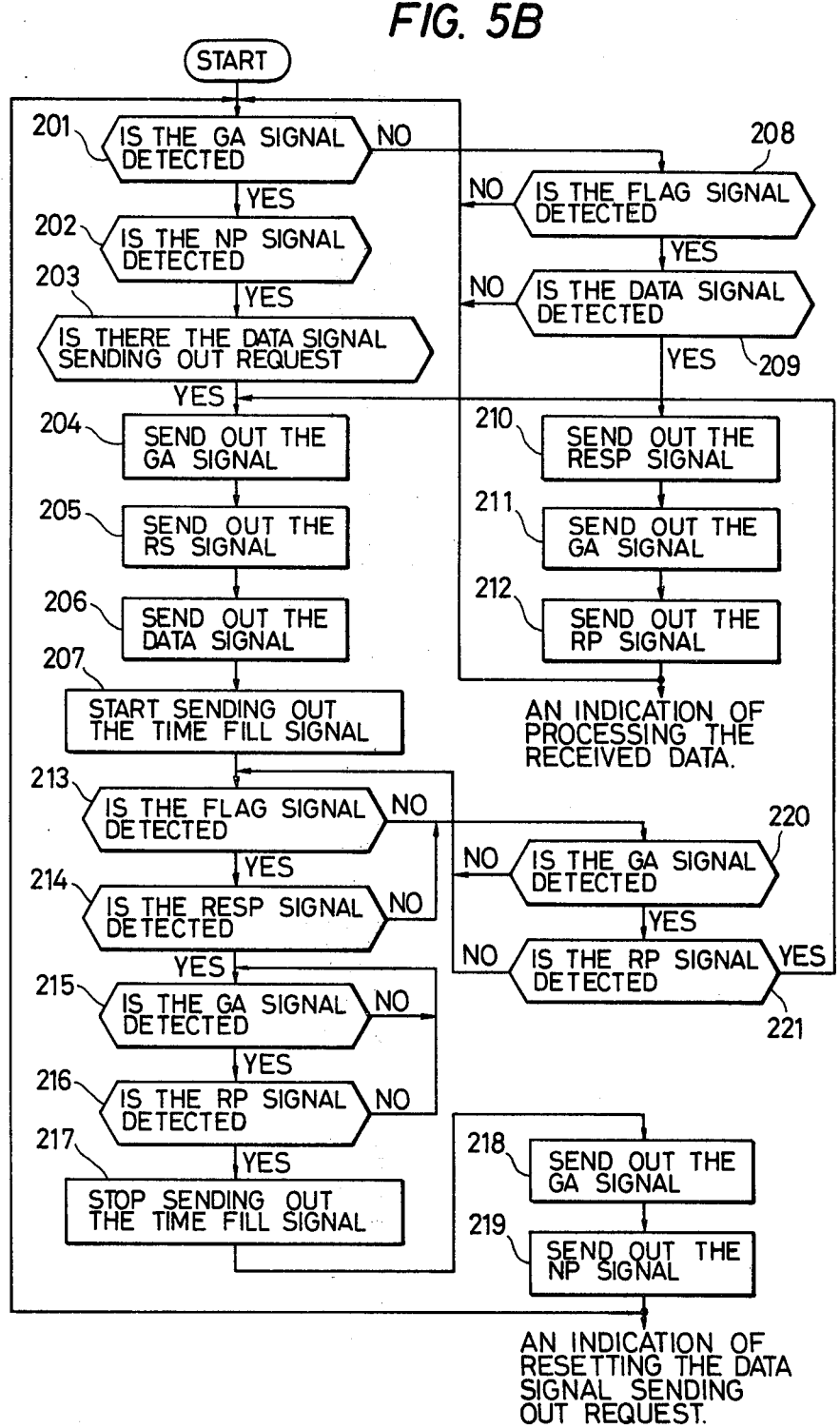

First, the case of FIGS. 6(A) and 6(B) will be described with reference to FIGS. 4(A), 4(B) and 4(C) and also FIGS. 5(A) and 5(B). As is well known, in order to bring the system into the steady state, the time fill signal is sent out from the central station CST, and the respective transmission stations TST have the signals delivered to the leads 42 and allow them to pass therethrough, thereby to be pulled into the synchronous states. Thereafter, the central station CST sends out the normal polling signal NPOL and subsequently the time fill signal. (Referring to FIG. 4(B), the signals are delivered to the leads 44 and 46 in steps 101 and 102 respectively. In a step 103, the signal is delivered to the lead 52 to set the timer of the time out detector 51. In a step 104, the signal is delivered to the lead 90 to send out the time fill signal.) When the signal NPOL has reached the transmission station $TST_1$ which is now assumed to have the data transmission request, this station $TST_1$ sends out the reserve signal RSV, thereafter sends out the data signal and subsequently sends out the time fill signal. (Referring to FIG. 5(B), when the signal NPOL has been detected in steps 201 and 202 and the data sending-out request has been detected in a step 203, the signals are delivering to the leads 44 and 50 in respective steps 204 and 205 so as to send out the signal RSV. In a step 206, the signal is delivered to the lead 77 to send out the data signal. In a step 207, the signal is delivered to the lead 90 to send out the time fill signal.) At this time, the transmission station $TST_1$ loses the signal on the lead 42 and turns from the signal passing state into a signal sinking state. In the time chart of FIG. 6(A), it is more precise to indicate the time for detecting the signal NPOL and the delay time based on the shift register 30, but they are omitted for the sake of brevity the description. Hereinbelow, the same applies to FIGS. 7(A) and 8(A). When the signal RSV sent out from the station $TST_1$ has passed through the stations $TST_2$ and $TST_3$ and has been detected by the signal detectors 25 and 28 of the central station CST, the central station CST inhibits the signal on the lead 90 to stop sending out the time fill signal, in order to pass therethrough the data signal to be transmitted subsequently to the reserve signal RSV. Further, the signal is delivered to the lead 42, and the signal is delivered to the lead 52 in order to reset the timer. (When the detection of the signal RS has been decided in steps 105 and 106, the delivery of the signal to the lead 90 is stopped in a step 107. Further, in a step 108, the timer of the time out detector 51 is set again so as to renew the time measurement.) Assuming that the receiving station of the data signal sent out from the station $TST_1$ is the station $TST_2$, this data signal is received by the receiver circuit 61 of the station $TST_2$. When it has been normally received, the response signal the receiving station of which is the station $TST_1$ is sent out by the transmitter circuit 71. Subsequently, the retry polling signal RPOL is sent out. (In the station $TST_2$, the normal reception of the data signal frame sent out by the station $TST_1$ is decided in steps 201, 208 and 209, and the signal is delivered to the lead 77 to send out the response signal in a step 210. In steps 211 and 212, the signals are respectively delivered to the leads 44 and 46 to send out the signal RPOL.) When the central station CST has detected the signal RPOL sent out from the station $TST_2$, by means of its signal detectors 25 and 27, it has the signal acquired on the lead 90 to send out the time fill signal again and sets the timer again. (When the detection of the signal RPOL has been decided in steps 109 and 110, the control flow returns to the steps 103 and 104.) The transmission station $TST_1$ stops sending out the time fill signal and sends out the signal NPOL when the response signal sent out from the station $TST_2$ has been received by the receiver 61, the normal reception being thus confirmed, and further, the signal RPOL has been detected. (When the detection of the signal RESP has been decided in steps 213 and 214 and the detection of the signal RPOL has been decided in steps 215 and 216, the control flow returns to the step 201 via steps 217, 218 and 219.) In this manner, one transmission cycle has ended, and the next transmission cycle is started by the normal polling signal to be subsequently sent out by the station $TST_1$.

FIG. 7(A) elucidates the case where the data frame sent out towards the station $TST_2$ by the station $TST_1$ has had undergone an error therein before being received by the station $TST_2$. Since, in this case, none of the stations performs the normal reception, neither the response signal nor the retry polling signal is sent out. At this time, the central station CST acquires the output from the time out detector 51 and comes to send out the retry polling signal. (When the time out has been finally detected by the repetition of the decisions of steps 105 and 111, the step 111 becomes YES, and the signal RPOL is sent out via steps 112, 113 and 114 (FIG. 4(C)). Herein, it is the same as in the case of the normal communication that the timer is set again by a step 115, whereupon the time fill signal is sent out by a step 116. Since the station $TST_1$ receives the retry polling signal RPOL while sending out the data signal, it comes to retransmit the data. (In the station $TST_1$, the flag signal is not detected in the step 213, and the signal GA is not detected in a step 220, either, so that these two steps are repeated. Meantime, when the retry polling signal has been sent out from the central station CST, the reception of the signal RPOL is decided in steps 220 and 221, and the control flow returns to the step 204 followed by the steps of sending out the reserve signal and the data signal.)

FIG. 8(A) elucidates the case where, although the transmission from the station $TST_1$ to the station $TST_2$ has been normally executed, an error has developed before the response signal from the station $TST_2$ reaches the station $TST_1$. Since, in this case, the central station CST receives the signal RPOL, it does not detect the time out. (The control flow returns from the steps 109 and 110 to the step 103.) The station $TST_1$ retransmits the data signal as in the case of the reception of the retry polling signal in FIG. 7(A).

While the aspects of typical data transmission and reception are understood from the above, another example of the aspect of transmission and reception in the central station CST will now be described with reference to FIGS. 4(B) and 4(C).

In some cases, none of the transmission stations TST has the data transmission request in spite of the fact that the central station CST has sent out the normal polling signal. At this time, the central station CST receives the signal NPOL which itself has sent out. The step 106 is NO, and is followed by a step 117. In the course in which the decisions of the steps 105, 106, 117 and 111 are repeated, the step 117 becomes YES. Then, the control flow proceeds to steps 118 and 101, and the system becomes the same as the initial state.

In some other cases, the signal RPOL sent out subsequently to the signal RESP from the station TST cannot be received by the central station CST. That is, the decisions of the steps 109 and 110 are not fulfilled. At this time, the step 109 becomes NO and proceeds to a step 119, which eventually detects the time out and becomes YES. Via the steps 113–116, the signal RPOL is sent out, and whether or not the signal RS, NP or RP sent out from any of the transmission stations TST is detected is decided in steps 120 and 121, 122 or 123. Unless the detection of the signal GA becomes YES in the step 120, the control flow proceeds to a step 124 which executes the decision of the detection of the time out.

Further, it is sometimes the case that, after the reserve signal RS has been received in the normal transmission and reception, the signal RP cannot be received, the signal NP or RS being received. At this time, the control flow returns to the step 103 through a step 125 or to the step 108 through a step 126. When the step 126 is NO, it proceeds to the step 119.

This invention is not restricted to the foregoing embodiment, but can be performed in any desired form. For example, it is needless to say that also the central station CST is permitted to receive the response signal so as to utilize it similarly to the other control signals.

We claim:

1. A data transmission system wherein a plurality of stations, including a central station and a plurality of transmission stations, are connected in series by a serial data transmission line so as to form a loop, and data is transmitted from one of the stations to another station, comprising:
   (1) said central station including;
      (A) means for sending out on said transmission line a normal polling signal which allows the transmission stations to send out data signals, and
      (B) means for monitoring the time interval from the time of the sending-out of said normal polling signal to the time of reception thereof, and for sending out, when said normal polling signal has not been received within a predetermined time interval since said time of said sending-out, a retry polling signal by which only the transmission station which has sent out the data signal in response to said normal polling signal is allowed to send out said data signal again; and
   (2) said transmission stations each including;
      (A) means for sending out on said transmission line said normal polling signal to the next station upon receiving said normal polling signal, when the particular transmission station has no data to be sent out,
      (B) means for inhibitiing the sending-out of said normal polling signal and for sending out the data signal in a predetermined format upon receiving said normal polling signal, when said particular transmission station has data to be sent out, said data signal including said data to be sent out and address data appointing the station to receive the former data, (C) means for sending out on said transmission line said retry polling signal to said next station upon receiving said retry polling signal, when said particular transmission station is not performing the data signal sending-out operation corresponding to the reception of said normal polling signal, (D) means for sending out on said transmission line said data signal corresponding to said reception of said normal polling signal again upon receiving said retry polling signal, when said particular transmission station is performing said data signal sending-out operation corresponding to said reception of said normal polling signal, (E) means for receiving said data signal upon detecting that said address data of the receiving station designates said particular transmission station, and (F) means for transferring the received data signal to said next station when said particular transmission station is not concerned with the transmission and reception of said data signal.

2. A data transmission system according to claim 1, wherein said means of said central station are equipped in one of said transmission stations.

3. A data transmission system wherein a plurality of stations are connected in series by a serial data transmission line so as to form a loop, and data are transmitted from one of the stations to another station, comprising:

(1) a central station including;
means to send out a normal polling signal which allows the transmission stations to send out data signals, and (2) said transmission stations each including;
(A) means to send out said normal polling signal to the next station upon receiving said normal polling signal, when the particular transmission station has no data to be sent out, (B) means to inhibit the sending-out of said normal polling signal and send out the data signal in a predetermined format upon receiving said normal polling signal, when said particular transmission station has the data to be sent out,
said data signal including said data to be sent out and address data appointing the station to receive the former data, (C) means to receive said data signal and decide whether or not said data signal has been correctly received, upon detecting that said address data of the receiving station appoint said particular transmission station, (D) means to send out a response signal in a predetermined format when the correct reception of said data signal has been determined,
said response signal including data indicative of the decision and address data indicating the station which has sent out the received data signal, (E) means to send out the same normal polling signal as sent out by said central station, upon receiving said response signal, and (F) means to transfer said received data signal to said next station when said particular transmission station is not concerned with the transmission and reception of said data signal.

4. A data transmission system according to claim 3, wherein said each transmission station further includes:

(A) means to send out a retry polling signal subsequently to the sending-out of said response signal,
said retry polling signal allowing only said station having sent out said data signal to send out said data signal again, and (B) means to send out said data signal again when said particular transmission station has received said retry polling signal without receiving said response signal.

5. A data transmission system according to any of claims 1 to 4, wherein said central station includes means for renewing the monitoring of the time interval of from the sending-out of said normal polling signal to the reception thereof upon detecting said retry polling signal.

6. A data transmission system according to claim 5, wherein said means of said central station are equipped in one of said transmission stations.

7. A data transmission method wherein the transmission and reception of data among a plurality of stations are controlled by a polling signal which allows the stations to send out data signals, comprising the steps of selectively generating as said polling signal either a normal polling signal or a retry polling signal in dependence upon the conditions of transmission and reception of data signals between stations, controlling the stations in response to said normal polling signal to send out data signals in common, and controlling the stations in response to said retry polling signal to permit only the station having already sent out the data signal in response to said normal polling signal to send out said data signal again.

8. A data transmission method wherein a plurality of stations are connected in series by a serial data transmission line so as to form a loop, and data is transmitted from one of the stations to another station, comprising:

(1) at a central station;
(A) sending out a normal polling signal which allows the transmission stations to send out data signals, and
(B) monitoring a time interval from a time of the sending-out of said normal polling signal to a time of reception thereof, and to send out, when said normal polling signal has not been received within a predetermined time interval since said time of said sending-out, a retry polling signal by which only the transmission station having sent out the data signal in response to said normal polling signal is allowed to send out said data signal again, and (2) at each of said transmission stations;
(A) sending out said normal polling signal to the next station upon receiving said normal polling signal, when the particular transmission station has no data to be sent out,
(B) inhibiting the sending-out of said normal polling signal and sending out the data signal in a predetermined format upon receiving said normal polling signal, when said particular transmission station has the data to be sent out,
said data signal including said data to be sent out and address data appointing the station to receive the former data,
(C) sending out said retry polling signal to said next station upon receiving said retry polling signal, when said particular transmission station is not performing the data signal sending-out corresponding to the reception of said normal polling signal, (D) sending out said data signal corresponding to said reception of said normal polling signal again upon receiving said retry polling signal, when said particular transmission station is performing said data signal sending-out corresponding to said reception of said normal polling signal, (E) receiving said data signal upon detecting that said address data of the receiving station appoint said particular transmission station, and (F) transferring the received data signal to said next station when said particular transmission station is not concerned with the transmission and reception of said data signal.

9. A data transmission method wherein a plurality of stations are connected in series by a serial data transmission line so as to form a loop, and data is transmitted from one of the stations to another station, comprising:

(1) at said central station;
sending out a normal polling signal which allows the transmission stations to send out data signals, and (2) at each of said transmission stations;

(A) sending out said normal polling signal to the next station upon receiving said normal polling signal, when the particular transmission station has no data to be sent out, (B) inhibiting the sending-out of said normal polling signal and sending out the data signal in a predetermined format upon receiving said normal polling signal, when said particular transmission station has the data to be sent out,
said data signal including said data to be sent out and address data appointing the station to receive the former data, (C) receiving said data signal and determining whether or not said data signal has been correctly received, upon detecting that said address data of the receiving station appoint said particular transmission station, (D) sending out a response signal in a predetermined format when the correct reception of said data signal has been determined,
said response signal including data to the effect of the decision and address data indicating the station which has sent out the received data signal, (E) sending out the same normal polling signal as sent out by said central station, upon receiving said response signal, and (F) transferring said received data signal to said next station when said particular transmission station is not concerned with the transmission and reception of said data signal.

10. A data transmission method according to claim 9 further including at each transmission station:

(A) sending out a retry polling signal subsequently to the sending-out of said response signal,
said retry polling signal allowing only said station having sent out said data signal to send out said data signal again, and (B) sending out said data signal again when said particular transmission station has received said retry polling signal without receiving said response signal.

11. A method of operating a serial loop communications network which includes a central station connected to the first and last stations of a plurality of serially-connected transmission stations for transmitting data signals between transmission stations comprising the steps of:

A. at said central station,
generating and transmitting to the first transmission station of the serially-connected stations a normal polling signal;

B. at each of said transmission stations,
monitoring the signals received via the network to detect the receipt of said normal polling signal,
when transmission of data to another transmission station is required generating and transmitting a reserve signal to a subsequent station upon receipt of said normal polling signal,
initiating the transmission of data signals-following transmission of said reserve signal,
when the data signals received via the network from another transmission station does not comprise an error signal generating and transmitting a response signal,
monitoring the signals received via the network to detect the receipt of said response signal, and
when said response signal received via the network from another transmission station does not comprise an error signal generating and transmitting said normal polling signal.

12. A method of operating a serial loop communications network which includes a central station connected to the first and last stations of a plurality of serially-connected transmission stations for transmitting data signals between transmission stations comprising the steps of:

A. at said central station,
generating and transmitting to the first transmission station of the serially-connected stations a normal polling signal and a retry polling signal when said normal polling signal has not been received within a predetermined time interval after said normal polling signal has been sent out;

B. at each of said transmission stations,
monitoring the signals received via the network to detect the receipt of said normal polling signal,
when transmission of data to another transmission station is required, generating and transmitting a reserve signal to a subsequent station upon receipt of said normal polling signal,
initiating the transmission of data signals-following transmission of said reserve signal,
when the data signals received via the network from another transmission station do not comprise an error signal, generating and transmitting a response signal,
initiating the transmission of said retry polling signal following transmission of said response signal,
monitoring the signals received via the network to detect the receipt of said response signal and retry polling signal, and
when said response signal and/or retry polling signal received via the network from another transmission station do not comprise an error signal generating and transmitting said normal polling signal.

13. A serial loop data communications system comprising:

a central station adapted to transmit and receive data signals;

a plurality of transmission stations adapted to receive and transmit data signals;

a transmission medium interconnecting said transmission stations in series and said central station to the first and last transmission station to thus form a serial transmission loop from the central station through the serially-connected transmission stations and back to the central station;

said central station including means for transmitting to the first transmission station a normal polling signal;

each of said transmission stations including, means for receiving and storing multi-bit signals received at the station via the transmission medium, decoding means responsive to the stored signals in the receiving and storage means for detecting said normal polling signal and for providing a first output signal upon detection of said normal polling signal, means responsive to said first output signal for transmitting a reserve signal when the station has data signals to transmit, means responsive to said first output signal for transmitting a data signal when said first output signal is provided immediately following transmission of said reserve signal, decoding means responsive to the stored signals in the receiving and storage means for detecting that transmitted data signals are addressing the transmission station and do not comprise an error signal and for providing a second output signal upon detection that said data signals are correct, means responsive to said second output signal for transmitting a response signal, means responsive to said second output signal for transmitting a retry polling signal when said second output signal is provided immediately following transmission of said response signal, decoding means responsive to the stored signals in the receiving and storage means for detecting that a transmitted response signal does not comprise an error signal and for providing a third output signal upon detection that said signals are correct, and means responsive to said third output signal for transmitting said normal polling signal.

14. A serial loop data communications system comprising:

a central station adapted to transmit and receive data signals;

a plurality of transmission stations adapted to receive and transmit data signals;

a transmission medium interconnecting said transmission stations in series and said central station to the first and last transmission station to thus form a serial transmission loop from the central station through the serially-connected transmission stations and back to the central station;

said central station including means for transmitting to the first transmission station a normal polling signal and a retry polling signal when said normal polling signal has not been received within a predetermined time interval after said normal polling signal is sent out;

each of said transmission stations including, means for receiving and storing multi-bit signals received at the station via the transmission medium, decoding means responsive to the stored signals in the receiving and storage means for detecting said normal polling and retry polling signals and for providing a first output signal upon detection of said normal polling and retry polling signals, means responsive to said first output signal for transmitting a reserve signal when the station has data signals to transmit, means responsive to said first output signal for transmitting a data signal when said first output signal is provided immediately following transmission of said reserve signal, decoding means responsive to the stored signals in the receiving and storage means for detecting that transmitted data signals are addressing the transmission station and do not comprise an error signal and providing a second output signal upon detection that said data signals are correct, means responsive to said second output signal for transmitting a response signal, means responsive to said second output signal for transmitting said retry polling signal when said second output signal is provided immediately following transmission of said response signal, decoding means responsive to the stored signals in the receiving and storage means for detecting that a transmitted response signal and/or retry polling signal do not comprise an error signal and providing a third output signal upon detection that said signals are correct, and means responsive to said third output signal for transmitting said normal polling signal.

* * * * *